United States Patent [19]
Sudau et al.

[11] Patent Number: 5,884,740
[45] Date of Patent: Mar. 23, 1999

[54] FRICTION CLUTCH

[75] Inventors: Jörg Sudau, Niederwerrn; Bernhard Schierling, Kürnach, both of Germany

[73] Assignee: Fichtel & Sachs AG, Schweinfurt, Germany

[21] Appl. No.: 847,671

[22] Filed: Apr. 24, 1997

[30] Foreign Application Priority Data

Apr. 24, 1996 [DE] Germany .................. 196 16 329.3

[51] Int. Cl.$^6$ .................................................. F16D 13/60
[52] U.S. Cl. .................... 192/70.17; 192/213.12
[58] Field of Search ............... 192/70.17, 213.1, 192/213.11, 213.12, 213; 74/574; 464/66, 68

[56] References Cited

U.S. PATENT DOCUMENTS

| | | |
|---|---|---|
| 4,081,064 | 3/1978 | Smith et al. . |
| 4,619,353 | 10/1986 | Maeda . |
| 4,790,419 | 12/1988 | Loizeau .................. 74/574 X |
| 4,828,038 | 5/1989 | Naudin . |
| 5,261,516 | 11/1993 | Friedmann .............. 74/574 X |
| 5,293,978 | 3/1994 | Reik et al. ............ 192/213.11 X |
| 5,680,918 | 10/1997 | Reik et al. ............... 74/574 X |

FOREIGN PATENT DOCUMENTS

| | | |
|---|---|---|
| 270 980 | 6/1988 | European Pat. Off. . |
| 2 364 361 | 7/1978 | France . |
| 2 560 314 | 8/1985 | France . |
| 2 608 238 | 6/1988 | France . |
| 2616184 | 12/1988 | France . |
| 1575988 | 1/1970 | Germany . |
| 4420934 | 4/1995 | Germany . |

Primary Examiner—Rodney H. Bonck
Attorney, Agent, or Firm—Cohen, Pontani, Lieberman & Pavane

[57] ABSTRACT

A friction clutch for arrangement in the power train of a motor vehicle. The friction clutch includes a flywheel mass arrangement to be fastened to an input shaft rotating about an axis of rotation. A pressure plate unit with a clutch housing is held at the flywheel mass arrangement. A contact-pressure plate is guided so as to be axially displaceable relative to the clutch housing and the flywheel mass arrangement. A clutch spring arrangement axially spring loads the contact-pressure plate toward the flywheel mass arrangement. A clutch disk with friction facings projects between, on the one side, friction surfaces of the flywheel mass arrangement which are located axially opposite one another and, on the other side, the contact-pressure plate. The flywheel mass arrangement and the contact-pressure plate are coupled with one another in a torsionally elastic manner with reference to the axis of rotation in order to limit the peak torque transmitted through the friction clutch. For this purpose, the flywheel mass arrangement is preferably constructed as a two-mass flywheel.

9 Claims, 2 Drawing Sheets ic
FRICTION CLUTCH

BACKGROUND OF THE INVENTION

1. Field of the Invention

The invention is directed to a friction clutch to be arranged in the power train of a motor vehicle.

2. Description of the Prior Art

A conventional friction clutch to be arranged in the power train of a motor vehicle includes a flywheel which is rotatable about an axis of rotation. The flywheel can be coupled to one end of a crankshaft of an internal combustion engine and has a friction surface facing away axially from the crankshaft. A friction facing of a clutch disk connectable with a transmission input shaft is connected in a frictional engagement with the friction surface of the flywheel when the friction clutch is engaged. A pressure plate unit is provided in order to apply the contact pressure force needed for the frictional engagement between the friction facing of the clutch disk and the friction surface of the flywheel. The pressure plate unit comprises a clutch housing which is rigidly connected with the flywheel radially outside the friction facing and extends radially inward so as to partially surround the clutch disk. A contact-pressure plate is supported axially against the clutch housing via a clutch spring. The contact-pressure plate is provided with a friction surface which is located opposite the friction surface of the flywheel facing the crankshaft and communicates with a friction facing of the clutch disk in a frictional connection when the friction clutch is engaged. Frictional forces of roughly equal magnitudes are transmitted to the clutch disk by the friction surface of the contact-pressure plate and the friction surface of the flywheel given an identical construction of these two friction surfaces. Torque is accordingly transmitted from the crankshaft to the clutch disk connected with the transmission input shaft via two separate torque transmission paths. The first torque transmission path extends from the flywheel, via the friction surface of the flywheel, directly to the clutch disk. The second torque transmission path extends from the flywheel to the clutch disk via the clutch housing, clutch spring, contact-pressure plate and friction surface provided at the latter. Torques of approximately equal magnitude are transmitted via both torque transmission paths.

In addition to the torques to be transmitted by the friction clutch during normal driving and shifting operation, peak torques which are generated, for example, by incorrect operation such as engaging the clutch in a jerking manner, are also transmitted to the clutch disk by the frictional engagement between the flywheel and clutch disk. In this connection, there exists the risk that these peak torques can damage components of the friction clutch itself, as well as components of the gearbox or transmission. In order to withstand these peak torques, which only occur occasionally, these components must exhibit a mechanical strength and robustness beyond that required for normal operation.

SUMMARY OF THE INVENTION

Accordingly, it is an object of the present invention to provide a friction clutch which makes it possible to limit the torques transmitted by the friction clutch.

Pursuant to this object, and others which will become apparent hereafter, one aspect of the present invention resides in a friction clutch to be arranged in the power train of a motor vehicle, the friction clutch comprising a flywheel mass arrangement to be fastened to an input shaft rotating about an axis of rotation, especially to a crankshaft of an internal combustion engine, a pressure plate unit with a clutch housing held at the flywheel mass arrangement, and a contact-pressure plate which is guided so as to be axially displaceable relative to the clutch housing and the flywheel mass arrangement. A clutch spring arrangement is provided so as to axially spring-load the contact-pressure plate toward the flywheel mass arrangement. A clutch disk with friction facings projects between, on the one side, friction surfaces of the flywheel mass arrangement which are located axially opposite one another and, on the other side, the contact-pressure plate. The clutch disk is connectable with an output shaft extending coaxial to the input shaft, especially of a transmission input shaft.

The friction clutch according to the invention is characterized in that the flywheel mass arrangement and the contact-pressure plate are coupled with one another in a torsionally elastic manner with reference to the axis of rotation.

In contrast to the conventional friction clutch in which the flywheel mass arrangement and the contact-pressure plate are connected with one another rigidly with respect to rotation, the torsionally elastic connection of these two components according to the invention makes it possible to limit the torque transmitted by the friction clutch. This means that when torques of corresponding magnitude occur, the contact-pressure plate can rotate relative to the flywheel mass arrangement and can thus decrease the torque transmitted by the friction surface of the contact-pressure plate to the clutch disk corresponding to this rotating movement. In so doing, the total torque transmitted by the friction clutch is reduced at the same time.

The torsionally elastic coupling of the flywheel mass arrangement and the contact-pressure plate is preferably realized in that two components succeeding one another in the torque transmission path between the friction surface of the flywheel mass arrangement and the friction surface of the contact-pressure plate are connected with one another in a torsionally elastic manner via at least one spring and so as to be rotatable relative to one another about the axis of rotation. This torque transmission path is formed by portions of the flywheel mass arrangement, the clutch housing, the clutch spring arrangement and the contact-pressure plate. The rotatable connection between two successive components ensures the possibility in at least one location of the torque transmission path, for components to rotate relative to one another and accordingly for a relative rotation between the flywheel mass arrangement and the contact-pressure plate, so that it is possible to limit the torque which can be transmitted by the friction clutch. In addition, the use of the spring for the torsionally elastic connection of the two successive components makes it possible to proportion the use of the torque-limiting action of the friction clutch and to define this in a reproducible manner. The spring is preferably a pressure spring.

The two components which succeed one another in the torque transmission path and are rotatable relative to one another preferably have stops located opposite one another in the circumferential direction. At least one spring is arranged between the steps. In this way, the torsionally elastic coupling between the flywheel mass arrangement and the contact-pressure plate can be realized in a simple manner.

The spring, of which there is at least one, is preferably fitted with pretensioning between the stops located opposite one another in the circumferential direction, so that the contact-pressure plate rotates relative to the flywheel mass arrangement only when a torque corresponding to the pre-tensioning of the installed springs is exceeded.

A particularly favorable and robust construction is achieved when the clutch housing is held at the flywheel mass arrangement so as to be rotatable and is coupled in a torsionally elastic manner with the flywheel mass arrangement via a spring, of which there is at least one. The components of the conventional friction clutch can be taken over in large part. The conventional rigid connection between the flywheel mass arrangement and the clutch housing need only be replaced by a torsionally elastic coupling of these two components, which can be accomplished at a relatively low cost in terms of construction.

In this respect, an axially acting spring preferably holds the clutch housing in a frictional engagement with the flywheel mass arrangement so that a portion of the driving torque to be transmitted by the friction clutch is transmitted from the flywheel mass arrangement to the clutch housing, from which it is further transmitted to the clutch disk via the clutch spring arrangement and the contact-pressure plate.

The axially acting spring is preferably designed so that it holds the clutch housing and the flywheel mass arrangement in a frictional engagement when the friction clutch is engaged, but at least partially relieves this frictional engagement when the friction clutch is disengaged. In so doing, the strength of the frictional engagement and accordingly the degree of torque which can be transmitted between the flywheel mass arrangement and the contact-pressure plate depends upon the coupling state of the friction clutch. This functionality is achieved in a particularly simple manner in that the axially acting spring is formed by the clutch spring arrangement or the clutch spring arrangement is at least a component part of the axially acting spring.

The flywheel mass arrangement is preferably constructed as a two-mass flywheel in which the first flywheel mass can be fastened to the input shaft and the second flywheel mass comprises the friction surface. The first and second flywheel masses are coupled with one another via a torsional vibration damper. In this way, a friction clutch is realized in which the variations in torque which are caused, for example, by rough running of the internal combustion engine are reduced by means of the torsional vibration damper and are accordingly kept away from the components succeeding the friction clutch in the power train. On the other hand, this friction clutch is also capable of absorbing torque peaks caused, e.g., by improper operation, via the torsionally elastic coupling of the flywheel mass arrangement with the contact-pressure plate and is accordingly able to protect the components following the friction clutch in the power train from these torque peaks.

In conjunction with the design of the flywheel mass arrangement as a two-mass flywheel, the torsionally elastic coupling of the flywheel mass arrangement with the contact-pressure plate results in a friction clutch which not only solves the problem of limiting the peak torques transmitted by the friction clutch, but which is also capable of solving a completely separate problem familiar from the field of conventional two-mass flywheels. The two flywheel masses of the two-mass flywheel which are coupled in a torsionally elastic manner form a spring-mass system having a resonant frequency. Normally, the torsionally elastic coupling of the two flywheel masses and their inert masses are so adapted to one another that this resonant frequency lies outside the speed range of the friction clutch during normal operation. In operating states not corresponding to normal operation of the friction clutch, e.g., when starting or stopping the internal combustion engine, it is possible nevertheless for resonances to be excited in the spring-mass system of the two-mass flywheel, which are considered undesirable and under unfavorable circumstances can even lead to destruction of the two-mass flywheel.

When the friction clutch is disengaged, i.e., when the frictional engagement of the flywheel mass arrangement with the contact-pressure plate via the clutch disk is interrupted, the flywheel mass arrangement, together with the contact-pressure plate which is coupled therewith in a torsionally elastic manner, forms a vibratory or oscillatory spring-mass system which can be considered as a "three-mass flywheel" in combination with the flywheel mass arrangement designed as a two-mass flywheel. The spring-mass system which is formed in this way when the friction clutch is disengaged, in contrast with the simple two-mass flywheel, has two resonant frequencies and accordingly a completely different resonant behavior. Given a suitable arrangement of the torsional vibration damper between the first flywheel mass and the second flywheel mass and an appropriate arrangement of the torsionally elastic coupling of the flywheel mass arrangement with the contact-pressure plate, this resonant behavior can be influenced such that the possibilities for exciting resonances are appreciably reduced in comparison with the conventional two-mass flywheel. The combination of these two functions—limiting the transmitted peak torque when the friction clutch is engaged and damping resonances when the friction clutch is disengaged—is achieved in a particularly effective manner in that a frictional engagement between the flywheel mass arrangement and the contact-pressure plate, such as that described between the clutch housing and flywheel mass arrangement, is reinforced when the friction clutch is engaged and is at least partially released when the friction clutch is disengaged.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PREFERRED EMBODIMENTS

Figure 1:
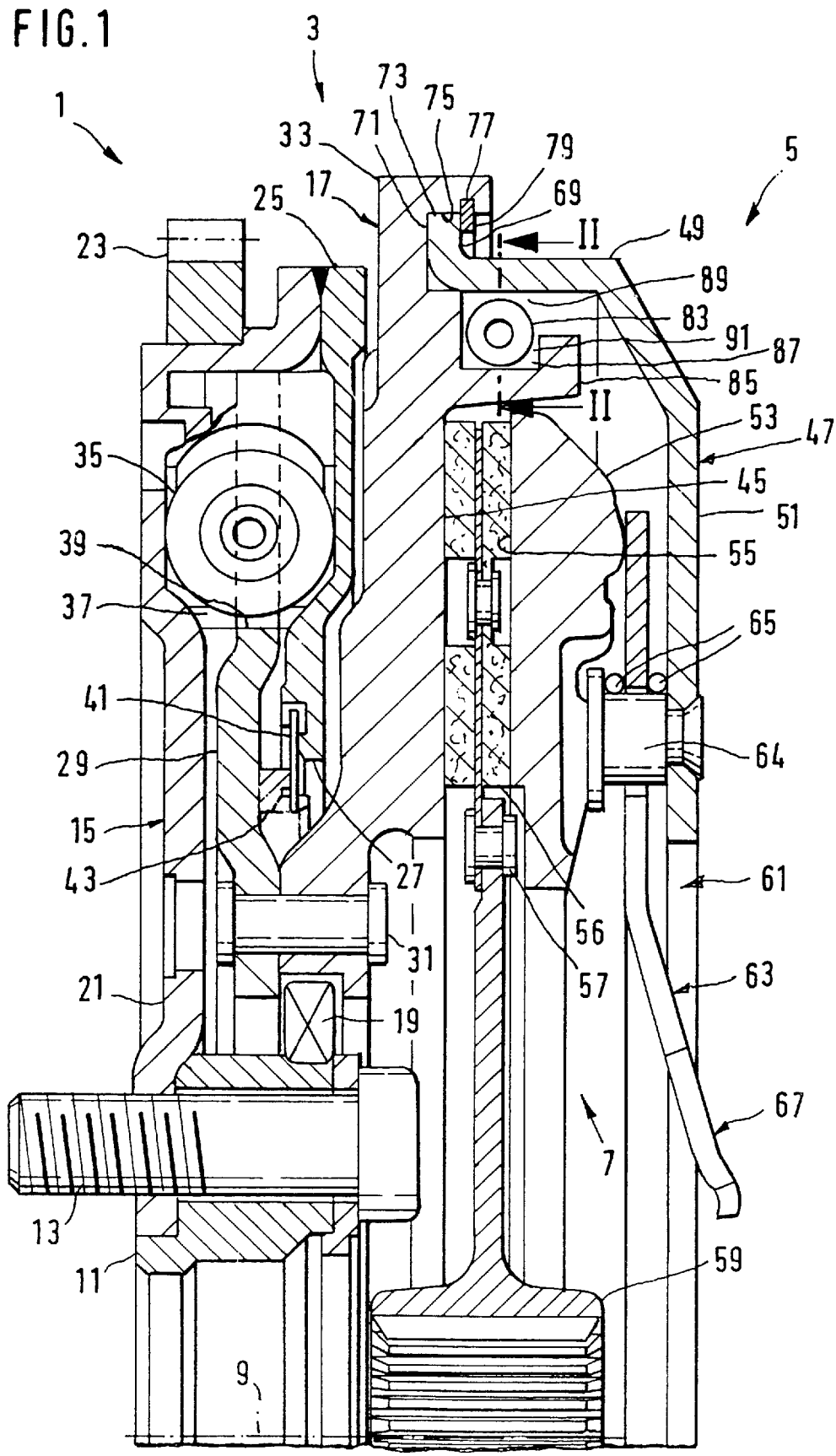
FIG. 1 shows a friction clutch according to the present invention in a sectional view along the axis of rotation.

The friction clutch 1 shown in FIG. 1 comprises a flywheel mass arrangement 3 which can be fastened to a crankshaft of an internal combustion engine, not shown, a pressure plate unit 5, and a clutch disk 7 which can be fastened to an input shaft of a transmission, likewise not shown. The flywheel mass arrangement 3, the pressure plate unit 5, and the clutch disk 7 are rotatable about a common axis of rotation 9.

In the embodiment shown in the drawing, the flywheel mass arrangement 3 is constructed as a two-mass flywheel and, in this connection, comprises a hub 11 which can be fastened to the crankshaft by screws 13. A first flywheel 15 is fixedly mounted at the hub 11 and a second flywheel 17 is supported via a bearing 19 so as to be rotatable about the axis of rotation 9. The first flywheel 15 is formed of a plurality of parts and includes a radially extending primary disk 21 which is fixedly connected with the hub 11, supports a starter ring gear 23 at its outer rim, and is fixedly connected, likewise at its outer rim, with a cover disk 25 which extends at a distance axially from the primary disk 21 to an inner rim 27 of the cover disk 25. The inner rim 27 is arranged radially outside of the bearing 19. The second flywheel 17 comprises a hub disk 29 which is arranged axially between the primary disk 21 and the cover disk 25. The hub disk 29 is connected, by means of rivets 31, with a counter-pressure plate 33 radially between the inner rim 27 of the cover disk 25 and the bearing 19. The counter-pressure plate 33 extends radially outward from the bearing 19 such that the cover disk 25 is arranged axially between the counter-pressure plate 33 and the hub disk 29.

The first flywheel 15 and the second flywheel 17 are coupled with one another in a torsionally elastic manner via a set of springs. The spring set is formed by a plurality of springs 35 which are oriented in the circumferential direction of the friction clutch 1. The springs 35 are loaded in the circumferential direction between, on the one side, stops 37 provided at the primary disk 21 and the cover disk 25 and, on the other side, edges of windows 39 provided in the hub disk 29. For the purpose of damping torsional vibrations between the first flywheel 15 and the second flywheel 17, a friction disk 41 is provided at the inner rim 27 of the cover disk 25. The friction disk 41 is in frictional contact with a friction facing 43 provided at the hub disk 29.

An annular clutch friction surface 45 is formed at the counter-pressure plate 33 on its side axially remote of the crankshaft and the first flywheel 15. The counter-pressure plate 33 is connected with the pressure plate unit 5 radially outside the clutch friction surface 45 such that the counter-pressure plate 33 and the pressure plate unit 5 are rotatable relative to one another about the axis of rotation 9.

The pressure plate unit 5 comprises a clutch housing 47 whose outer surface region 49 first extends axially away from the counter-pressure plate 33 and then passes into a clutch spring retaining region 51 which extends inward radially and is thus arranged at a distance axially from the clutch friction surface 45 of the counter-pressure plate 33. An annular contact-pressure plate 53 with a clutch friction surface 55 facing the clutch friction surface 45 of the counter-pressure plate 33 is arranged axially between the counter-pressure plate 33 and the clutch spring retaining region 51. The contact-pressure plate 53 is centered around the axis of rotation 9 and is axially displaceable. Friction facings 56 of the clutch disk 7 are arranged between the two clutch friction surfaces 45, 55 which are thus located opposite one another axially. These friction facings 56 are connected by rivets 57 with a hub part 59 of the clutch disk 7, the hub part 59 being provided for fastening to the transmission input shaft.

In order to apply the contact pressure force required for the frictional engagement between the clutch friction surfaces 45, 55 and the friction facings 56 when the friction clutch 1 is engaged, the pressure plate unit 5 comprises a clutch spring unit 61 with an annular diaphragm spring 63 which is held in the circumferential region and radially close to the inner rim of the clutch spring retaining region 51 by a holder 64. In so doing the spring 63 is clamped swivelably between two tilting rings 65. The diaphragm spring 63 contacts the contact-pressure plate 53 radially outside the tilting rings 65 accompanied by pretensioning so as to load the contact-pressure plate 53 in the direction of the counter-pressure plate 33. In order to release the frictional engagement between the clutch friction surfaces 45, 55, on the one hand, and the friction facings 56, on the other hand, the contact pressing force exerted by the pretensioned diaphragm spring 63 on the contact-pressure plate 53 can be canceled by actuating a release bearing, not shown, which acts on tongues 67 of the diaphragm spring 63 radially inside the tilting rings 65.

The outer surface region 49 of the clutch housing 47 has, at its end facing the counter-pressure plate 33, an annular flange 69 extending radially outward and projecting into an annular groove 71 provided in the counter-pressure plate 33. The clutch housing 47 is centered around the axis of rotation 9 relative to the counter-pressure plate 33 in that an outer rim 73 of the annular flange 69 contacts a cylindrical inner surface 75 of the annular groove 71. An annular spring 79 is inserted into another annular groove 77 recessed into the cylindrical inner surface 75 so that the annular flange 69 is arranged axially between this annular spring 79 and the base of the annular groove 71. As a result, the clutch housing 47 is fixed axially relative to the counter-pressure plate 33. The annular flange 69 of the clutch housing 47, on the one hand, and the annular groove 71 and annular spring 79, on the other hand, accordingly form a swivel bearing which enables the rotation of the clutch housing 47 relative to the counter-pressure plate 33.

Figure 2:
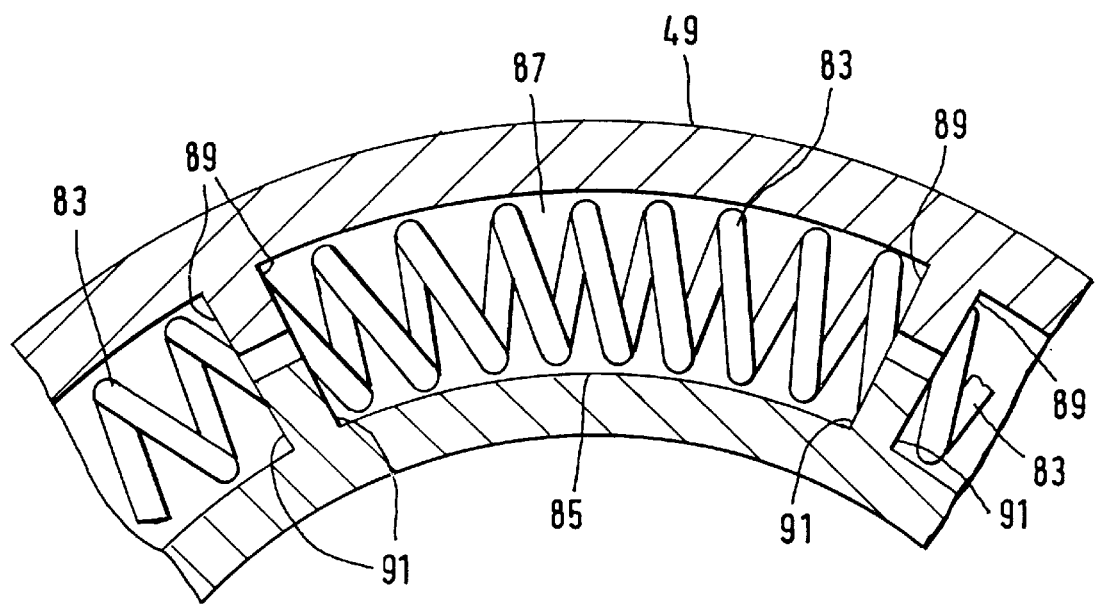
FIG. 2 shows the friction clutch in a partial sectional view vertically to the axis of rotation along line II—II from FIG. 1.

The rotation of the clutch housing 47 relative to the counter-pressure plate 33 is held in the neutral position shown in detail in FIG. 2 by a set of springs. The spring set comprises a plurality of helical springs 83 arranged around the axis of rotation 9 so as to be distributed in the circumferential direction and oriented in the circumferential direction in each instance. The helical springs 83 are arranged in chambers 87 which are formed radially between the inner wall of the outer surface region 49 of the clutch housing 47 and an annular flange 85 provided at the pressure plate 33. The chambers 87 are defined in the circumferential direction by stop faces 89 which are provided at the inner side of the outer surface region 49 and which project radially inward, and by associated stop faces 91 which are provided at the annular flange 85 and project radially outward. In the neutral position, as is shown in FIG. 2, each of the helical springs 83, under pretensioning, makes contact at each end with the stop faces 89 constructed at the clutch housing 47 and with the stop faces 91 formed at the counter-pressure plate 33. A rotation of the clutch housing 47 relative to the counter-pressure plate 33, i.e., a deflection out of the neutral position shown in FIG. 2, accordingly leads to a further compression of the helical springs 83 and accordingly to a restoring force which tries to return the clutch housing 47 to the neutral position relative to the counter-pressure plate 33. The clutch housing 47 is rotatable relative to the counter-pressure plate 33 while the helical springs 83 are increasingly compressed until the helical springs 83 lock up, thus limiting the rotation of the clutch housing 47 relative to the counter-pressure plate 33.

The construction described above accordingly results in a friction clutch 1 in which the clutch housing 47 is held in a torsionally elastic manner at the counter-pressure plate 33, wherein adjustment of the curve of the restoring force as a function of the rotation path and adjustment of the maximum possible rotation path can be effected by means of the dimensioning of the helical springs 83 and the chambers 87.

When the friction clutch 1 is closed, driving torque is transmitted from the crankshaft of the internal combustion engine, via the hub 11, to the first flywheel 15 and from there to the second flywheel 17 via the springs 35, wherein the springs 35 together with the friction disk 41 and friction facing 43 lead to a damping of torsional vibrations of the internal combustion engine. The driving torque is transmitted from the second flywheel 17 to the friction facings 56 of the clutch disk 7 and accordingly via the hub part 59 to the transmission input shaft. The driving torque is transmitted from two sides to the friction facings 56 of the clutch disk 7, namely from the friction surface 45 at the counter-pressure plate 33 on the one hand and from the friction surface 55 at the contact-pressure plate 53 on the other hand. At a given contact pressure force of the contact-pressure plate 53 against the friction facings 56 and accordingly of the friction facings 56 against the pressure plate 33, the driving torque is correspondingly divided into two torque transmission paths. The first torque transmission path leads from the second flywheel 17 via its counter-pressure plate 33 and the clutch friction surface 45 provided at the counter-pressure plate 33 to the clutch disk 7. The second torque transmission path leads from the second flywheel 17 via the counter-pressure plate 33 to the clutch housing 47 and then, via the springs 63 and the contact-pressure plate 53, to the clutch disk 7.

Accordingly, in the second torque transmission path the contact-pressure plate 53 and the clutch housing 47 are connected with one another so as to be rigid against rotation. However, the clutch housing 47 is connected with the counter-pressure plate 33 in a torsionally elastic manner.

The counterforce corresponding to the contact pressure force of the contact-pressure plate 53 exerted by the diaphragm spring 63 in the direction of the counter-pressure plate 33 when the friction clutch 1 is closed is transmitted via the clutch housing 47 to the counter-pressure plate 33, wherein the annular flange 69 comes into contact with the annular spring 79 under axial pressure. If the driving torque transmitted to the second torque transmission path exceeds a value given by the pretensioning of the helical springs 83 and the friction force acting between the annular flange 69 and the annular spring 79 accompanied by axial force loading, the clutch housing 49 rotates relative to the counter-pressure plate 33. In so doing, the contact-pressure plate 53 stays back as viewed in the rotating direction of the counter-pressure plate 33 and participates to a correspondingly lesser degree in the transmission of driving torque to the clutch disk 7 and accordingly in its slip. This results in a limiting of the peak torque which can be transmitted by the friction clutch 1.

When the friction clutch 1 is disengaged, no driving torque is transmitted from the crankshaft of the internal combustion engine to the clutch disk 7, but the flywheel mass arrangement 3 and pressure plate unit 5 rotate together with the crankshaft of the internal combustion engine about the axis of rotation 9 and, in so doing, form a spring-mass system which is formed of three inert masses coupled with one another via two springs in series.

The first mass is formed by the first flywheel 15, described above, which is coupled via the springs 35 with the second inert mass of the spring-mass system, namely the second flywheel 17, in a torsionally elastic manner. The third inert mass of this spring-mass system is formed by the clutch housing 47, the diaphragm spring 63, its holder 64 and the contact-pressure plate 53 and is coupled in a springing manner to the second flywheel 17 by the torsionally elastic coupling between the clutch housing 47 and the counter-pressure plate 33. Since the contact pressure force of the contact-pressure plate 53 is canceled in the direction of the counter-pressure plate 33 by the clutch release, not shown, in the disengaged state of the friction clutch 1, the annular flange 69 also does not contact the annular spring 79 under axial force. When suitably designed, the annular flange 69 can be held with a slight axial and radial play relative to the counter-pressure plate 33 so that there is essentially no frictional force acting between these two components so as to impede rotational movement about the axis of rotation 9.

Thus, when the friction clutch 1 is disengaged the spring-mass system described above forms a "three-mass flywheel" which, with a suitable design of the springs 35 and the helical springs 83 and an appropriately dimensioned distribution of mass between the first flywheel 15, the second flywheel 17 and the pressure plate unit 5, leads to a marked improvement in the resonance behavior of the spring-mass system in comparison to the conventional two-mass flywheel.

The type of torsionally elastic coupling between the flywheel mass arrangement 3 and the contact-pressure plate 53 can be modified not only by means of the selection of the spring strength of the springs 83, but also by the influence of the frictional force acting between the flywheel mass arrangement 3 and contact-pressure plate 53 during rotation. For example, a relatively large peak torque can be transmitted in that the torsionally elastic coupling makes use of relatively strong, especially heavily pretensioned springs for the torsionally elastic coupling or in that a relatively large frictional force acts between the components which are rotatable relative to one another.

The springs 83 need not be arranged, as was described above, in chambers formed between the inner wall of the outer surface region 49 of the clutch housing 47 and the annular flange 85 at the counter-pressure plate 33. Rather, the springs 83 can be held by means of disks which are arranged at a distance from one another axially or radially and provided with windows or projections for supporting the springs 83. The holder for the spring 35 of the two-mass flywheel between the disks 21, 25 and 29 can serve as a model for such a construction.

Further, instead of the torsionally elastic connection between the clutch housing 47 and the counter-pressure plate 33, a torsionally elastic connection can be provided between two other components following one another in the second torque transmission path described above so that a limiting of the peak torques transmitted by the friction clutch can be achieved. For example, the connection between the clutch housing 47 and the contact-pressure plate 53 can be effected in a torsionally elastic manner by means of a suitable design of the holder 64.

On the other hand, in contrast to the construction of the flywheel mass arrangement 3 in the above-described embodiment as a two-mass flywheel, it is also conceivable to connect the counter-pressure plate 33 with the crankshaft of the internal combustion engine such that it is fixed with respect to rotation relative thereto and to provide a corresponding torsional vibration damper in the clutch disk 7, e.g., by means of a divided hub part 59 of the clutch disk 7 that is coupled via springs. In so doing, the torsional vibration damper in the clutch disk 7 can protect the transmission gearing downstream thereof from torque fluctuations of the internal combustion engine when the friction clutch 1 is in the engaged state, and peak torques are suppressed as a result of the ability of the clutch housing 47 to rotate relative to the counter-pressure plate 33. In the disengaged state of the friction clutch 1, the counter-pressure plate 33 and the pressure plate unit 5, which is coupled to the latter in a torsionally elastic manner, form a spring-mass system which can be viewed as a two-mass flywheel with corresponding resonance behavior.

A pushed friction clutch was described in the preceding embodiment. However, it is also easily possible to realize the torsionally elastic coupling between the flywheel mass arrangement and the contact-pressure plate as a pulled friction clutch.

The invention is not limited by the embodiments described above which are presented as examples only but can be modified in various ways within the scope of protection defined by the appended patent claims.

We claim:

1. A friction clutch to be arranged in a power train of a motor vehicle having an input shaft rotatable about an axis of rotation, the friction clutch comprising:

a flywheel mass arrangement fastenable to the input shaft and having a friction surface;

a pressure plate assembly including a clutch housing held at the flywheel mass arrangement, a contact-pressure plate guided so as to be axially displaceable relative to the clutch housing and the flywheel mass arrangement, and clutch spring means for spring loading the contact-pressure plate axially toward the flywheel mass arrangement, the contact-pressure plate having a friction surface axially opposite the friction surface of the flywheel mass arrangement;

a clutch disk having friction facings arranged to project between the friction surfaces of the flywheel mass arrangement and the contact-pressure plate, the clutch disk being connectable with an output shaft coaxial to the input shaft; and means for coupling the flywheel mass arrangement and the contact-pressure plate with one another in a torsionally elastic manner with reference to the axis of rotation, the coupling means including at least one spring arranged to connect together two of the flywheel mass arrangement, the clutch housing, the clutch spring means and the contact-pressure plate, that follow one another in a torque transmission path between the friction surface of the flywheel mass arrangement and the friction surface of the contact-pressure plate in a torsionally elastic manner and rotatable relative to one another about the axis of rotation, the clutch housing being held rotatably at the flywheel mass arrangement and coupled in a torsionally elastic manner with the flywheel mass arrangement by the at least one spring.

2. A friction clutch according to claim 1, wherein the at least one spring is a pressure spring.

3. A friction clutch according to claim 1, and further comprising stops mounted on the two of the flywheel mass arrangement, the clutch housing, the clutch spring means and the contact-pressure plate that follow one another in the torque transmission path, the stops being arranged opposite one another in the circumferential direction, the at least one spring being arranged between the stops.

4. A friction clutch according to claim 3, wherein the spring is configured to be pretensioned between the stops.

5. A friction clutch according to claim 1, and further comprising an axially acting spring arranged to hold the clutch housing in a frictional engagement with the flywheel mass arrangement.

6. A friction clutch according to claim 5, wherein the axially acting spring is configured to at least partially relieve the frictional engagement of the clutch housing with the flywheel mass arrangement when the friction clutch is disengaged.

7. A friction clutch according to claim 6, wherein the clutch spring means includes the axially acting spring.

8. A friction clutch according to claim 6, wherein the clutch spring means is configured as a component part of the axially acting spring.

9. A friction clutch according to claim 1, wherein the flywheel mass arrangement is a two-mass flywheel having a first flywheel mass fastenable to the input shaft and a second flywheel mass having the friction surface, and torsional vibration damper means for coupling the second flywheel mass with the first flywheel mass in a torsionally elastic manner.

* * * * *